(12) United States Patent
Daniel

(10) Patent No.: US 10,175,558 B2
(45) Date of Patent: Jan. 8, 2019

(54) CAMERA SHIELD SYSTEM

(71) Applicant: George Daniel, Upper Marlboro, MD (US)

(72) Inventor: George Daniel, Upper Marlboro, MD (US)

(*) Notice: Subject to any disclaimer, the term of this patent is extended or adjusted under 35 U.S.C. 154(b) by 129 days.

(21) Appl. No.: 15/163,959

(22) Filed: May 25, 2016

(65) Prior Publication Data

US 2017/0343885 A1 Nov. 30, 2017

(51) Int. Cl.
G03B 11/04 (2006.01)
B60R 11/04 (2006.01)
B60R 11/00 (2006.01)

(52) U.S. Cl.
CPC ............ *G03B 11/045* (2013.01); *B60R 11/04* (2013.01); *B60R 2011/004* (2013.01)

(58) Field of Classification Search
CPC . G03B 11/045; B60R 1/00; B60R 2300/8046; B60R 11/04; B60R 2011/004
USPC ........................................................ 348/151
See application file for complete search history.

(56) References Cited

U.S. PATENT DOCUMENTS

| | | | |
|---|---|---|---|
| 3,715,149 A | 2/1973 | Freeland | |
| 4,295,706 A | 10/1981 | Frost | |
| 7,037,007 B2 | 5/2006 | Ohmori et al. | |
| 8,475,063 B1 | 7/2013 | Chang | |
| D720,792 S | 1/2015 | So et al. | |
| 2002/0003571 A1* | 1/2002 | Schofield | B60C 23/00 348/148 |
| 2006/0103727 A1 | 5/2006 | Tseng | |
| 2013/0129338 A1 | 5/2013 | Dowell | |
| 2014/0104426 A1* | 4/2014 | Boegel | B60R 1/00 348/148 |
| 2014/0226012 A1* | 8/2014 | Achenbach | B60R 11/04 348/148 |
| 2016/0107585 A1* | 4/2016 | Sugiura | B60R 11/04 296/1.08 |
| 2016/0200264 A1* | 7/2016 | Bingle | B60R 11/04 348/148 |
| 2017/0039856 A1* | 2/2017 | Park | G01C 21/34 |

FOREIGN PATENT DOCUMENTS

GB 805083 A * 11/1958 ........... G03B 11/045

OTHER PUBLICATIONS

Quartytypo, Car Backup camera rain shield, May 4, 2013, YouTube, https://youtu.be/5VSw4jSZA4E, See the shield at 2:15.*

* cited by examiner

*Primary Examiner* — Marnie A Matt

(57) ABSTRACT

A camera shield system includes a vehicle that has a back side. At least one camera is coupled to the back side. The at least one camera may display an area behind the vehicle when the vehicle is backing. Thus, the vehicle may avoid striking an object when backing. At least one cone is provided. The at least one cone is coupled to the back side and the at least one cone is positioned to surround the at least one camera. Thus, the at least one cone inhibits the at least one camera from becoming obstructed with precipitation.

3 Claims, 6 Drawing Sheets

CAMERA SHIELD SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to shield devices and more particularly pertains to a new shield device for inhibiting a vehicle backing camera from becoming obstructed with precipitation.

BRIEF SUMMARY OF THE INVENTION

An embodiment of the disclosure meets the needs presented above by generally comprising a vehicle that has a back side. At least one camera is coupled to the back side. The at least one camera may display an area behind the vehicle when the vehicle is backing. Thus, the vehicle may avoid striking an object when backing. At least one cone is provided. The at least one cone is coupled to the back side and the at least one cone is positioned to surround the at least one camera. Thus, the at least one cone inhibits the at least one camera from becoming obstructed with precipitation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
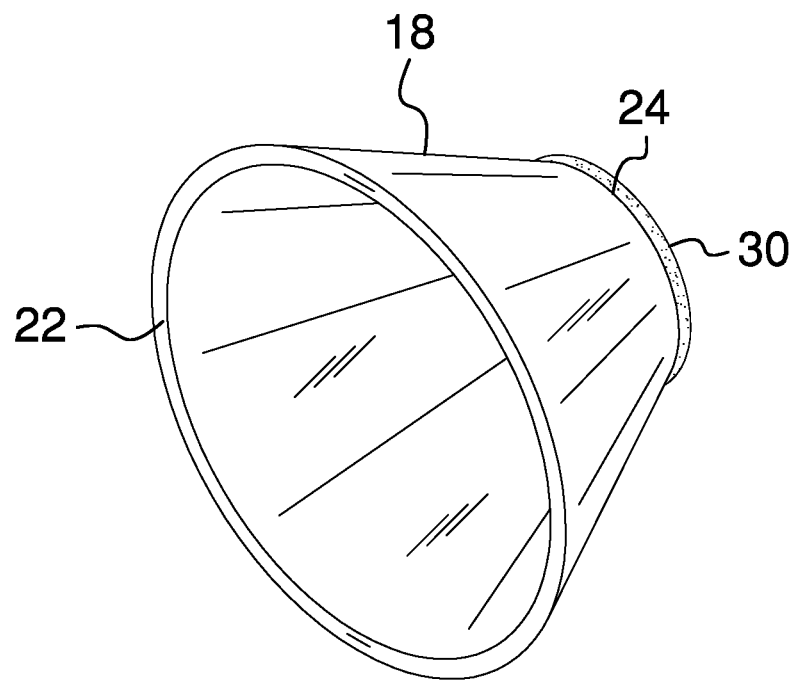
FIG. 1 is a perspective view of a camera shield system according to an embodiment of the disclosure.
Figure 2:
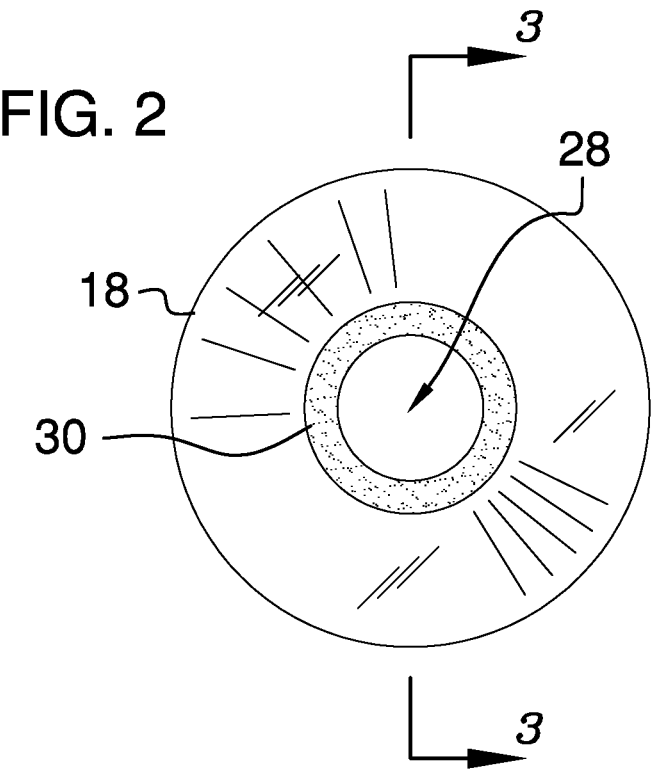
FIG. 2 is a back view of an embodiment of the disclosure.
Figure 3:
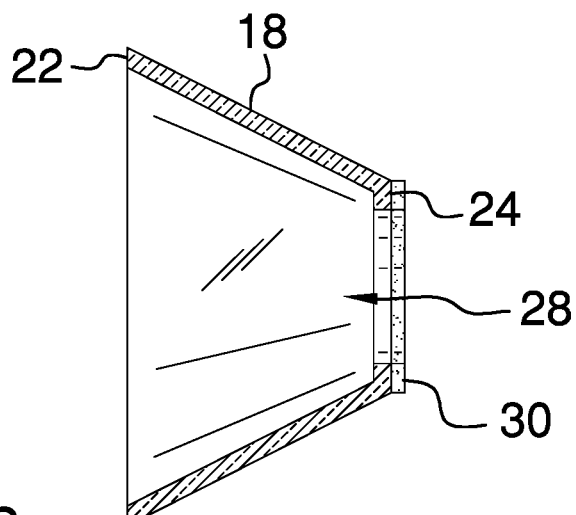
FIG. 3 is a cross sectional view taken along line 3-3 of FIG. 2 of an embodiment of the disclosure.
Figure 4:
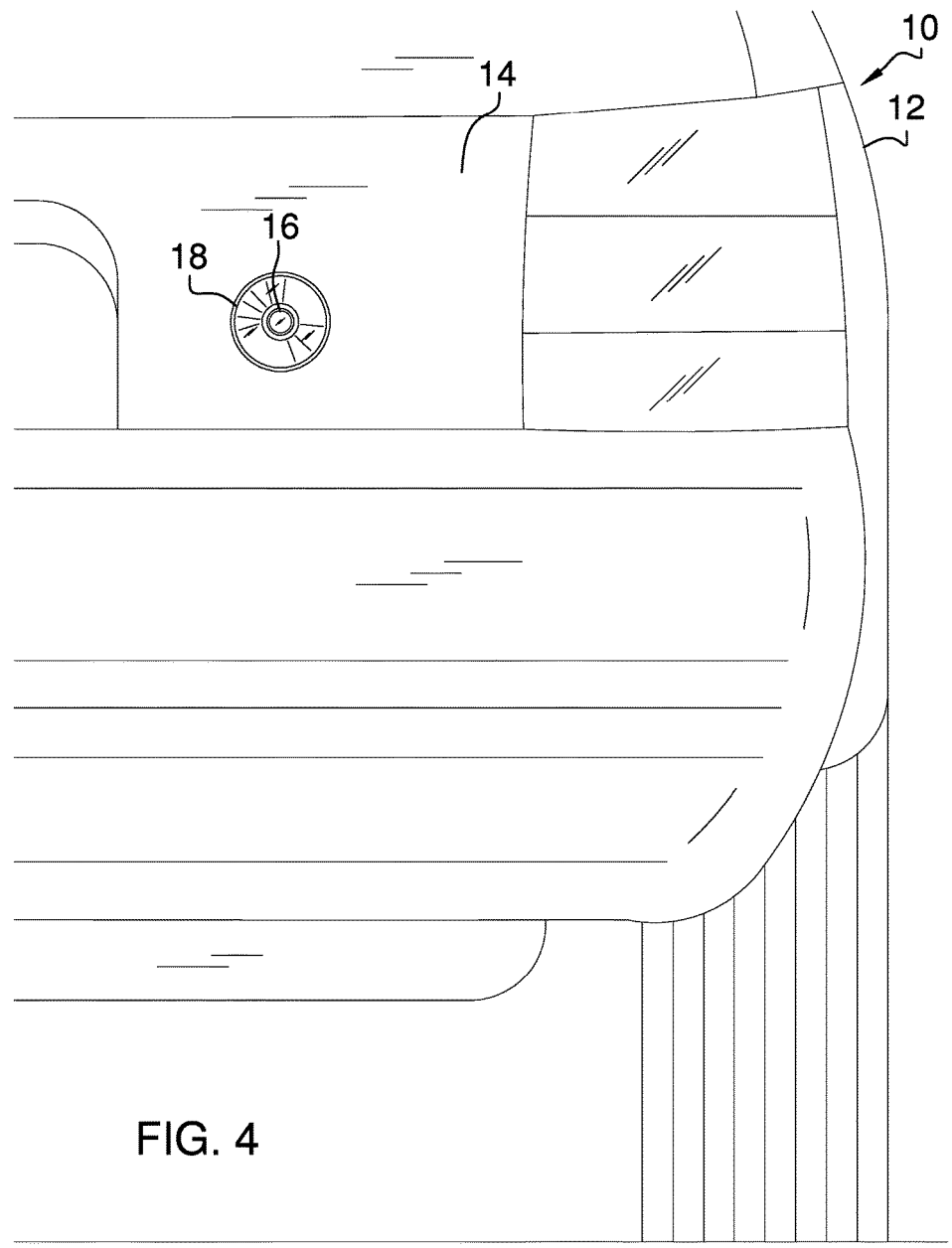
FIG. 4 is a back perspective in-use view of an embodiment of the disclosure.
Figure 5:
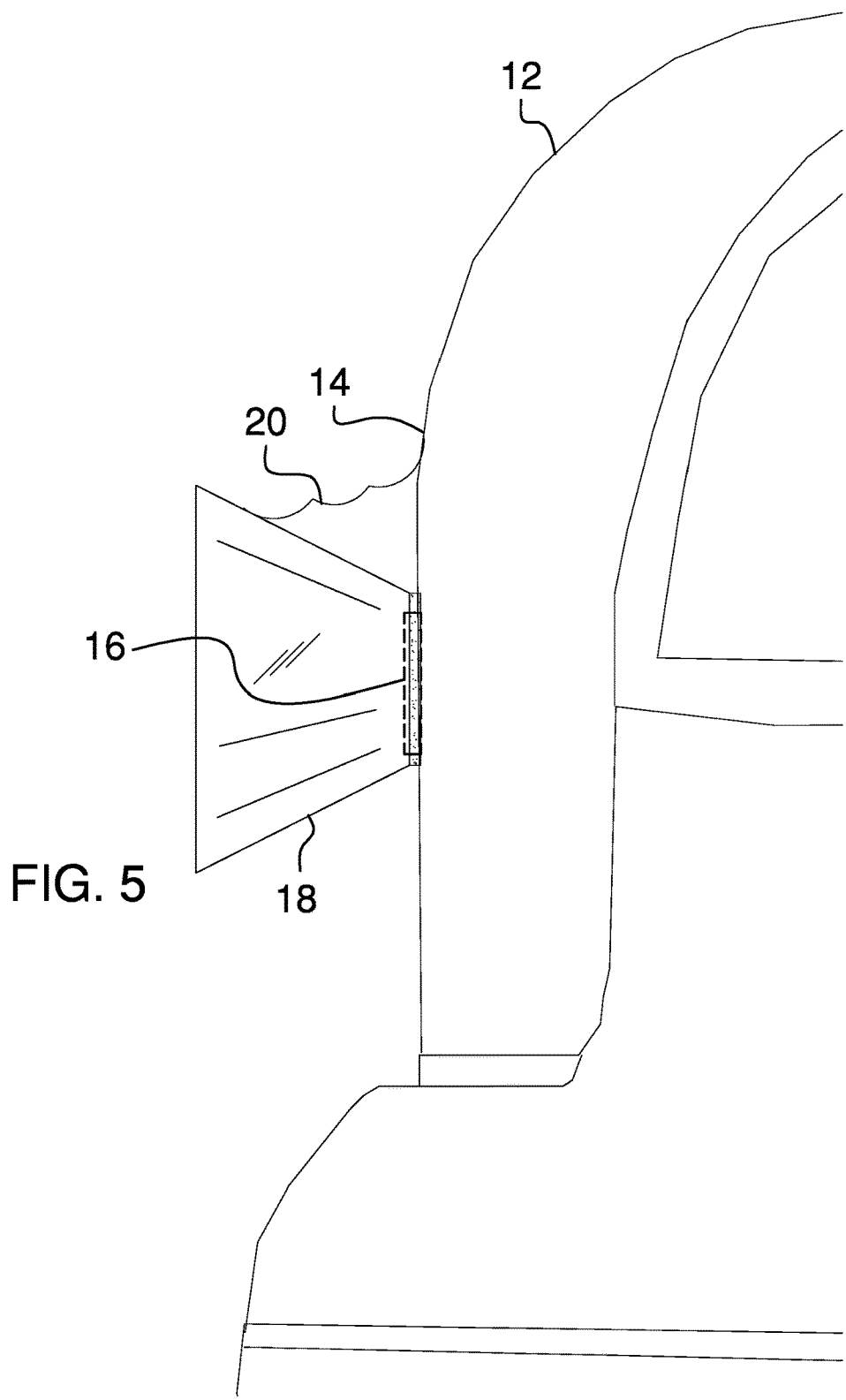
FIG. 5 is a right side perspective in-use view of an embodiment of the disclosure.

With reference now to the drawings, and in particular to FIGS. 1 through 8 thereof, a new shield device embodying the principles and concepts of an embodiment of the disclosure and generally designated by the reference numeral 10 will be described.

As best illustrated in FIGS. 1 through 8, the camera shield system 10 generally comprises a vehicle 12 that has a back side 14. The vehicle 12 may be a passenger vehicle or the like. At least one camera 16 is coupled to the back side 14. The at least one camera 16 displays an area behind the vehicle 12 when the vehicle 12 is backing. Thus, the vehicle 12 may avoid striking an object when backing. The at least one camera 16 may be an integral component of a backing assist system or the like.

At least one cone 18 is provided and the at least one cone 18 is coupled to the back side 14. The at least one cone 18 is positioned to surround the at least one camera 16. The at least one cone 18 is comprised of a fluid impermeable material. Thus, the at least one cone 18 inhibits the at least one camera 16 from becoming obstructed with precipitation 20. The precipitation 20 may comprise rain, snow or ice. The at least one cone 18 facilitates the at least one camera 16 to display the area behind the vehicle 12 in all weather conditions.

The at least one cone 18 has a front end 22, a back end 24 and an outer wall 26 extending therebetween. The front end 22 is open and the back end 24 has an aperture 28 extending therethrough. The outer wall 26 tapers inwardly between the front end 22 and the back end 24. The back end 24 is removably attached to the back side 14 of the vehicle 12 and the back end 24 surrounds the at least one camera 16.

An adhesive layer 30 is provided. The adhesive layer 30 is coupled to the back end 24 of the at least one cone 18. The adhesive layer 30 extends around the aperture 28. Moreover, the adhesive layer 30 adhesively engages the back side 14 of the vehicle 12. Thus, the at least one cone 18 is removably retained on the vehicle 12.

Figure 6:
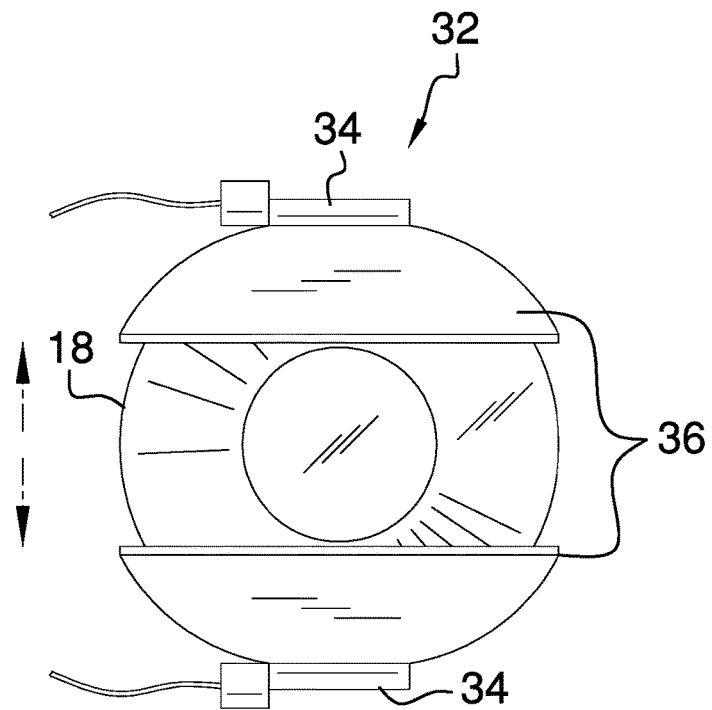
FIG. 6 is a back view of an alternative embodiment of the disclosure.

In an alternative embodiment 32 as shown in FIG. 6, a pair of motors 34 may be provided and each of the motors 34 may be attached to the at least one cone 18. Each of the motors 34 may be electrically coupled to the vehicle 12. A pair of flaps 36 may be provided and each of the flaps 36 may be hingedly coupled to an associated one of the motors 34. Each of the motors 34 may selectively position the associated flap 36 to cover the at least one cone 18.

Figure 7:
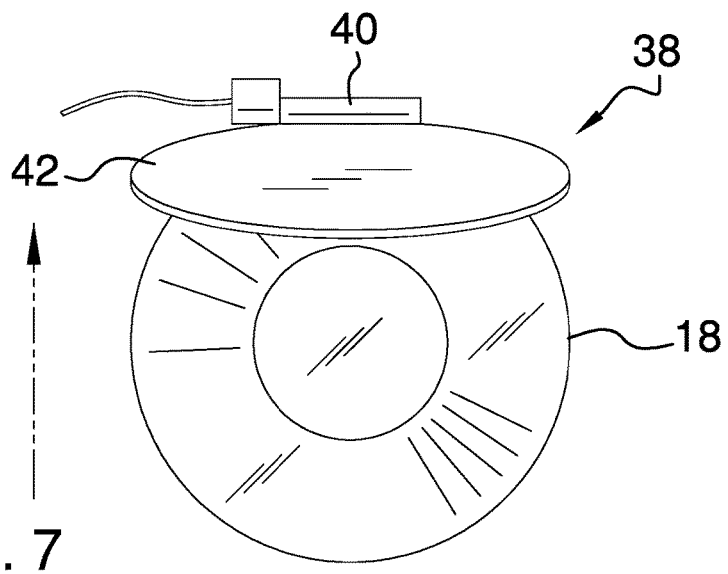
FIG. 7 is a back perspective view of an alternative embodiment of the disclosure.

In an alternative embodiment 38 as shown in FIG. 7, a motor 40 may be coupled to the at least one cone 18. The motor 40 may be electrically coupled to the vehicle 12. A door 42 may be provided and the door 42 may be hingedly coupled to the motor 40. The motor 40 may selectively close the door 42 over the at least one cone 18.

Figure 8:
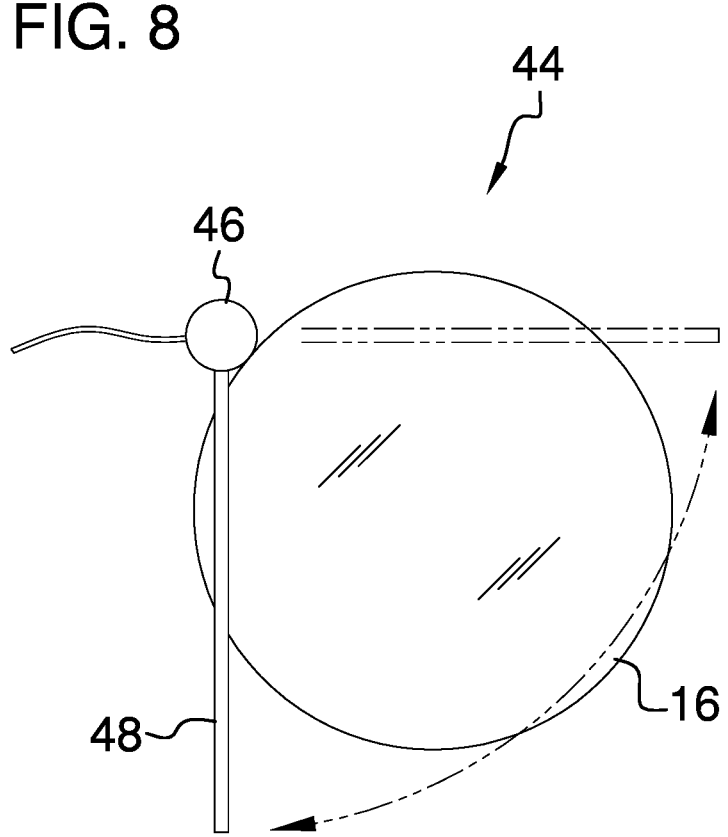
FIG. 8 is a perspective view of an alternative embodiment of the disclosure.

In an alternative embodiment 44 as shown in FIG. 8, a motor 46 may be provided. The motor 46 may be coupled to the back side 14 of the vehicle 12. Moreover, the motor 46 may be aligned with the at least one camera 16. The motor 46 may be electrically coupled to the vehicle 12. A wiper 48 may be movably coupled to the motor 46. Thus, the motor 46 may urge the wiper 48 across the at least one camera 16 to remove precipitation from the at least one camera 16.

In use, the at least one cone 18 is manipulated to facilitate the adhesive layer 30 to adhesively engage the back side 14 of the vehicle 12. Moreover, the at least one cone 18 is positioned such that the back end 24 surrounds the at least one camera 16. Thus, the at least one cone 18 inhibits precipitation 20 from collecting on the at least one camera 16.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A camera shield system comprising:
a vehicle having a back side;
at least one camera being coupled to said back side wherein said at least one camera is configured to display an area behind said vehicle when said vehicle is backing thereby facilitating said vehicle to avoid striking an object when backing; and
a cone, said cone being coupled to said back side, cone having a front end, a back end and an outer wall extending between said front end and said back end, said back end having an aperture extending therethrough, said outer wall tapering inwardly between said front end and said back end, said back end being removably attached to said back side having said back end surrounding said at least one camera, said cone being positioned to surround said at least one camera wherein said cone is configured to inhibit said at least one camera from becoming obstructed with precipitation, said front end being open.

2. The system according to claim 1, further comprising an adhesive layer being coupled to said back end of said at least one cone, said adhesive layer adhesively engaging said back side of said vehicle such that said at least one cone is removably retained on said vehicle.

3. A camera shield system comprising:
a vehicle having a back side;
at least one camera being coupled to said back side wherein said at least one camera is configured to display an area behind said vehicle when said vehicle is backing thereby facilitating said vehicle to avoid striking an object when backing;
at least one cone, said at least one cone being coupled to said back side, said at least one cone being positioned to surround said at least one camera wherein said at least one cone is configured to inhibit said at least one camera from becoming obstructed with precipitation, said at least one cone having a front end, a back end and an outer wall extending therebetween, said front end being open, said back end having an aperture extending therethrough, said outer wall tapering inwardly between said front end and said back end, said back end being removably attached to said back side having said back end surrounding said at least one camera; and
an adhesive layer being coupled to said back end of said at least one cone, said adhesive layer extending around said aperture, said adhesive layer adhesively engaging said back side of said vehicle such that said at least one cone is removably retained on said vehicle.

* * * * *